United States Patent
Schafer et al.

(10) Patent No.: US 12,174,844 B1
(45) Date of Patent: Dec. 24, 2024

(54) SYSTEM, METHOD, AND COMPUTER PROGRAM PRODUCT FOR SEARCHING A PLURALITY OF DOCUMENTS BASED ON A TEXT STRING

(71) Applicant: Clearbrief, Inc., Seattle, WA (US)

(72) Inventors: Jacqueline Grace Schafer, Seattle, WA (US); Jose Demetrio Saura, Seattle, WA (US)

(73) Assignee: Clearbrief, Inc., Seattle, WA (US)

( * ) Notice: Subject to any disclaimer, the term of this patent is extended or adjusted under 35 U.S.C. 154(b) by 0 days.

(21) Appl. No.: 18/754,249

(22) Filed: Jun. 26, 2024

Related U.S. Application Data (60) Provisional application No. 63/523,167, filed on Jun. 26, 2023.

(51) Int. Cl.
*G06F 16/2457* (2019.01)
*G06F 16/93* (2019.01)

(52) U.S. Cl.
CPC ........ *G06F 16/24578* (2019.01); *G06F 16/93* (2019.01)

(58) Field of Classification Search
CPC ............................ G06F 16/24578; G06F 16/93
See application file for complete search history.

(56) References Cited

U.S. PATENT DOCUMENTS

| | | | |
|---|---|---|---|
| 2007/0150473 A1* | 6/2007 | Li | G06F 16/951 |
| 2022/0180059 A1 | 6/2022 | Lee | |
| 2023/0123574 A1* | 4/2023 | Guberman | G06F 40/253 704/9 |

* cited by examiner

*Primary Examiner* — Hau H Hoang
(74) *Attorney, Agent, or Firm* — The Webb Law Firm (57) ABSTRACT

Provided are systems, methods, and computer program products for searching a plurality of documents based on a text string. The system includes at least one processor programmed or configured to identify a plurality of documents including a plurality of document types, each document of the plurality of documents including a document type, receive a text string based on user input, generate, with a machine-learning model, an ordered list of document types based the text string, search the plurality of documents for the text string to identify a subset of documents based on similarity between the text string and each document of the subset of documents, rank the subset of documents based at least partially on the similarity, a document type of each document of the subset of documents, and the ordered list of document types, and generate a graphical user interface based on the ranked list of documents.

20 Claims, 3 Drawing Sheets

SYSTEM, METHOD, AND COMPUTER PROGRAM PRODUCT FOR SEARCHING A PLURALITY OF DOCUMENTS BASED ON A TEXT STRING

CROSS REFERENCE TO RELATED APPLICATION

This application claims the benefit of U.S. Provisional Patent Application No. 63/523,167, filed on Jun. 26, 2023, the disclosure of which is hereby incorporated by reference in its entirety.

BACKGROUND

1. Field

This disclosure relates generally to document processing and, in non-limiting embodiments or aspects, systems, methods, and computer program products for searching a plurality of documents based on a text string.

2. Technical Considerations

When drafting a document, such as a legal brief, it is common for authors to omit citations to sources, particularly factual sources, to avoid disrupting their writing. In some examples, a user may note the need for a citation but will plan to add it at a later time, after the brief is drafted or the like. For example, an author may type an assertion that they recall is supported by a factual document, such as a deposition transcript, but may not recall which document includes the support.

Existing word processing applications operate independently of source documents that correspond to assertions in a textual document being authored within the word processing application. As a result, authors must operate several additional software applications and/or computing devices to locate and cite to source documents. Further, finding an associated document to cite can be difficult and resource-intensive, especially in examples in which a quotation or portion thereof appears in several different documents.

SUMMARY

According to non-limiting embodiments or aspects, provided is a system comprising at least one processor programmed or configured to: identify a plurality of documents comprising a plurality of document types, each document of the plurality of documents comprising a document type of the plurality of document types; receive a text string based on user input; generate, with a machine-learning model, an ordered list of document types based the text string; search the plurality of documents for the text string to identify a subset of documents based on similarity between the text string and each document of the subset of documents; rank the subset of documents based at least partially on the similarity, a document type of each document of the subset of documents, and the ordered list of document types; and generate a graphical user interface based on the ranked list of documents.

In non-limiting embodiments or aspects, wherein receiving the text string comprises identifying a selected portion of a textual document, the text string comprising the selected portion of the textual document and/or a portion of the textual document related to the selected portion. In non-limiting embodiments or aspects, wherein generating the ordered list of document types based one the text string comprises: determining at least one assertion based on the text string; and inputting a vector representing the at least one assertion into the machine-learning model, the machine-learning model configured to output the ordered list of document types. In non-limiting embodiments or aspects, wherein each document of the plurality of documents comprises metadata comprising the document type. In non-limiting embodiments or aspects, the at least one processor is further programmed or configured to: generate a citation based on a document from the ranked list of documents. In non-limiting embodiments or aspects, the plurality of document types comprises at least one of the following: court orders, transcripts, briefs, pleadings, or any combination thereof. In non-limiting embodiments or aspects, the at least one processor is further programmed or configured to: classify, with at least one classification model, each document of the plurality of documents, such that each document is classified as at least one document type. In non-limiting embodiments or aspects, wherein receiving the text string comprises: receiving the user input; identifying the text string based on the user input; and pre-processing the text string.

According to non-limiting embodiments or aspects, provided is a computer-implemented method comprising: identifying, with at least one processor, a plurality of documents comprising a plurality of document types, each document of the plurality of documents comprising a document type of the plurality of document types; receiving, with at least one processor, a text string based on user input; generating, with at least one processor and a machine-learning model, an ordered list of document types based the text string; searching, with at least one processor, the plurality of documents for the text string to identify a subset of documents based on similarity between the text string and each document of the subset of documents; ranking, with at least one processor, the subset of documents based at least partially on the similarity, a document type of each document of the subset of documents, and the ordered list of document types; and generating, with at least one processor, a graphical user interface based on the ranked list of documents.

In non-limiting embodiments or aspects, wherein receiving the text string comprises identifying a selected portion of a textual document, the text string comprising the selected portion of the textual document and/or a portion of the textual document related to the selected portion. In non-limiting embodiments or aspects, wherein generating the ordered list of document types based the text string comprises: determining at least one assertion based on the text string; and inputting a vector representing the at least one assertion into the machine-learning model, the machine-learning model configured to output the ordered list of document types. In non-limiting embodiments or aspects, wherein each document of the plurality of documents comprises metadata comprising the document type. In non-limiting embodiments or aspects, further comprising: generating a citation based on a document from the ranked list of documents. In non-limiting embodiments or aspects, the plurality of document types comprises at least one of the following: court orders, transcripts, briefs, pleadings, or any combination thereof. In non-limiting embodiments or aspects, further comprising: classifying, with at least one classification model, each document of the plurality of documents, such that each document is classified as at least one document type. In non-limiting embodiments or aspects, wherein receiving the text string comprises: receiving the user input; identifying the text string based on the user input; and pre-processing the text string.

According to non-limiting embodiments or aspects, provided is a computer program product comprising at least one non-transitory computer-readable medium including program instructions that, when executed by at least one processor, cause the at least one processor to: identify a plurality of documents comprising a plurality of document types, each document of the plurality of documents comprising a document type of the plurality of document types; receive a text string based on user input; generate, with a machine-learning model, an ordered list of document types based the text string; search the plurality of documents for the text string to identify a subset of documents based on similarity between the text string and each document of the subset of documents; rank the subset of documents based at least partially on the similarity, a document type of each document of the subset of documents, and the ordered list of document types; and generate a graphical user interface based on the ranked list of documents.

In non-limiting embodiments or aspects, wherein receiving the text string comprises identifying a selected portion of a textual document, the text string comprising the selected portion of the textual document and/or a portion of the textual document related to the selected portion. In non-limiting embodiments or aspects, wherein generating the ordered list of document types based one the text string comprises: determining at least one assertion based on the text string; and inputting a vector representing the at least one assertion into the machine-learning model, the machine-learning model configured to output the ordered list of document types. In non-limiting embodiments or aspects, wherein each document of the plurality of documents comprises metadata comprising the document type.

Further non-limiting embodiments and aspects are provided in the following clauses:

Clause 1: A system comprising at least one processor programmed or configured to: identify a plurality of documents comprising a plurality of document types, each document of the plurality of documents comprising a document type of the plurality of document types; receive a text string based on user input; generate, with a machine-learning model, an ordered list of document types based the text string; search the plurality of documents for the text string to identify a subset of documents based on similarity between the text string and each document of the subset of documents; rank the subset of documents based at least partially on the similarity, a document type of each document of the subset of documents, and the ordered list of document types; and generate a graphical user interface based on the ranked list of documents.

Clause 2: The system of clause 1, wherein receiving the text string comprises identifying a selected portion of a textual document, the text string comprising the selected portion of the textual document and/or a portion of the textual document related to the selected portion.

Clause 3: The system of clause 1 or 2, wherein generating the ordered list of document types based one the text string comprises: determining at least one assertion based on the text string; and inputting a vector representing the at least one assertion into the machine-learning model, the machine-learning model configured to output the ordered list of document types.

Clause 4: The system of any of clauses 1-3, wherein each document of the plurality of documents comprises metadata comprising the document type.

Clause 5: The system of any of clauses 1-4, wherein the at least one processor is further programmed or configured to: generate a citation based on a document from the ranked list of documents.

Clause 6: The system of any of clauses 1-5, wherein the plurality of document types comprises at least one of the following: court orders, transcripts, briefs, pleadings, or any combination thereof.

Clause 7: The system of any of clauses 1-6, wherein the at least one processor is further programmed or configured to: classify, with at least one classification model, each document of the plurality of documents, such that each document is classified as at least one document type.

Clause 8: The system of any of clauses 1-7, wherein receiving the text string comprises: receiving the user input; identifying the text string based on the user input; and pre-processing the text string.

Clause 9: A computer-implemented method comprising: identifying, with at least one processor, a plurality of documents comprising a plurality of document types, each document of the plurality of documents comprising a document type of the plurality of document types; receiving, with at least one processor, a text string based on user input; generating, with at least one processor and a machine-learning model, an ordered list of document types based the text string; searching, with at least one processor, the plurality of documents for the text string to identify a subset of documents based on similarity between the text string and each document of the subset of documents; ranking, with at least one processor, the subset of documents based at least partially on the similarity, a document type of each document of the subset of documents, and the ordered list of document types; and generating, with at least one processor, a graphical user interface based on the ranked list of documents.

Clause 10: The computer-implemented method of clause 9, wherein receiving the text string comprises identifying a selected portion of a textual document, the text string comprising the selected portion of the textual document and/or a portion of the textual document related to the selected portion.

Clause 11: The computer-implemented method of clause 9 or 10, wherein generating the ordered list of document types based the text string comprises: determining at least one assertion based on the text string; and inputting a vector representing the at least one assertion into the machine-learning model, the machine-learning model configured to output the ordered list of document types.

Clause 12: The computer-implemented method of any of clauses 9-11, wherein each document of the plurality of documents comprises metadata comprising the document type.

Clause 13: The computer-implemented method of any of clauses 9-12, further comprising: generating a citation based on a document from the ranked list of documents.

Clause 14: The computer-implemented method of any of clauses 9-13, wherein the plurality of document types comprises at least one of the following: court orders, transcripts, briefs, pleadings, or any combination thereof.

Clause 15: The computer-implemented method of any of clauses 9-14, further comprising: classifying, with at least one classification model, each document of the plurality of documents, such that each document is classified as at least one document type.

Clause 16: The computer-implemented method of any of clauses 9-15, wherein receiving the text string comprises:

receiving the user input; identifying the text string based on the user input; and pre-processing the text string.

Clause 17: A computer program product comprising at least one non-transitory computer-readable medium including program instructions that, when executed by at least one processor, cause the at least one processor to: identify a plurality of documents comprising a plurality of document types, each document of the plurality of documents comprising a document type of the plurality of document types; receive a text string based on user input; generate, with a machine-learning model, an ordered list of document types based the text string; search the plurality of documents for the text string to identify a subset of documents based on similarity between the text string and each document of the subset of documents; rank the subset of documents based at least partially on the similarity, a document type of each document of the subset of documents, and the ordered list of document types; and generate a graphical user interface based on the ranked list of documents.

Clause 18: The computer program product of clause 17, wherein receiving the text string comprises identifying a selected portion of a textual document, the text string comprising the selected portion of the textual document and/or a portion of the textual document related to the selected portion.

Clause 19: The computer program product of clause 17 or 18, wherein generating the ordered list of document types based one the text string comprises: determining at least one assertion based on the text string; and inputting a vector representing the at least one assertion into the machine-learning model, the machine-learning model configured to output the ordered list of document types.

Clause 20: The computer program product of any of clauses 17-19, wherein each document of the plurality of documents comprises metadata comprising the document type.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server, or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided herein are systems, methods, and computer program products for searching a plurality of documents based on a text string that improve upon existing word processing systems and/or document searching systems. For example, systems and methods described herein may provide for an efficient generation of a ranked list of search results for a given text string, providing more accurate results and using fewer computational resources. As an example, by combining the separate outputs of a model with the output of a semantic search engine, improved accuracy is achieved without increasing computational complexity and use of resources associated therewith.

Figure 1:
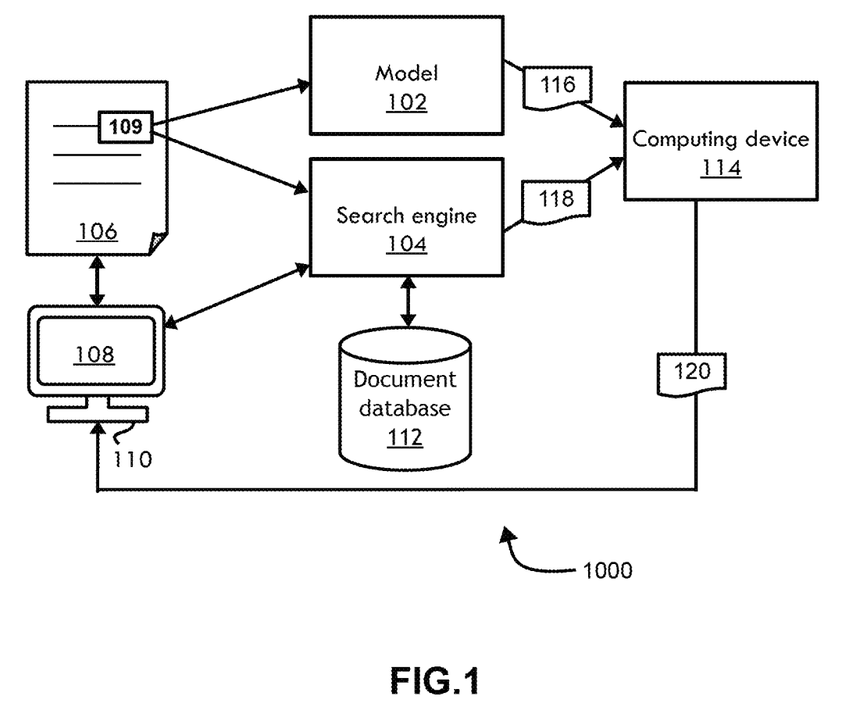
FIG. 1 illustrates a schematic diagram of a system for searching a plurality of documents based on a text string according to non-limiting embodiments or aspects.

Referring now to FIG. 1, a system 1000 for searching a plurality of documents is shown according to non-limiting embodiments. The system 1000 includes a search engine 104, which may include one or more computing devices and/or software applications executed by one or more computing devices. In non-limiting embodiments, the search engine 104 may be executed by a client computing device 110. Additionally or alternatively, the search engine 104 may be executed by one or more servers in communication with the client computing device 110. For example, the search engine 104 may be one or more client-side applications, one or more server-side applications, or a combination of client-side and server-side applications.

With continued reference to FIG. 1, the client computing device 110 may execute a word processing application or be in communication with a word processing application service. The word processing application may display a graphical user interface (GUI) 108 on the client computing device 110. The GUI 108 may display a textual document 106. A user of the client computing device 110 may draft, edit, save, view, and interact with the textual document 106. The client computing device 110 may locally store the textual document 106 and/or the textual document 106 may be displayed from remote storage. The textual document 106 may also be displayed on a document reading application such that it cannot be edited but a user can select text. The textual document 106 may include, for example, a legal document such as a contract, an internal company investigation memorandum, a legal brief, a court document, and/or any other type of document to be viewed.

Still referring to FIG. 1, the system 1000 includes a model 102, which may further include one or more models executable by one or more computing devices and/or software applications executed by one or more computing devices. In non-limiting embodiments, the model 102 may be stored and/or executed by the client computing device 110. Additionally or alternatively, the model 102 may be stored and/or executed by one or more servers in communication with the client computing device 110. In some non-limiting embodiments, the model 102, search engine 104, and/or word processing application may be integrated into one application interface. It will be appreciated that other arrangements are possible.

With continued reference to FIG. 1, a document database 112 may include a plurality of documents that have been classified by document type. The document type may be metadata associated with each document. The document database 112 may be stored on one or more data storage devices. The document database 112 may be local or remote to the client computing device 110 and/or search engine 104. The documents stored in the document database 112 may be stored in association with a document type, which is determined by processing each of the documents in the document database 112 with a classification model (not shown in FIG. 1) configured to output a document type based on an inputted document. In some non-limiting embodiments, a document type may be based on a content of the document, and may include, for example, court order, transcript, brief, pleading, and/or other like document types. In non-limiting embodiments, a document type may not be based on an encoding or format of the document (e.g., PDF, text, rich text, image, and/or the like) of the document.

The user of the client computing device 110, during operation, may select a portion 109 (e.g., a sentence, a portion of a sentence, multiple sentences, and/or the like) of the textual document 106. The selected portion 109 may be highlighted, copied, typed (e.g., into a search bar), and/or the like. In some non-limiting embodiments, the portion 109 of the textual document 106 may be more than what the user selected, such as contextual portions of the textual document 109 (e.g., one or more preceding sentences or words, one or more succeeding sentences or words, and/or the like). The portion 109 may be represented as a string that is input into the model 102 and the search engine 104. In non-limiting embodiments, the portion 109 that is input into the model 102 may be different than the portion input into the search engine 104. For example, the model 102 may receive more preceding words and/or sentences for context, whereas the search engine 104 may only receive the segment selected by the user. It will be appreciated that varying inputs based on a user selection in a textual document may be used as inputs to the model 102 and/or search engine 104. In some examples, the portion 109 may be processed before being input into the model 102 and/or search engine 104. For example, the portion 109 may be normalized, filtered, cleaned, and/or processed with other operations. In some non-limiting embodiments, the portion 109 may be derived from selected text. For example, the portion 109 used as input for the model 102 and/or search engine 104 may include a vector representing at least one assertion based on a text string. In such examples, the vector is the input to the model 102.

With continuing reference to FIG. 1, the model 102 may output an ordered list 116 of document types based on the inputted portion 109. The ordered list 116 may include a prioritized list of document types, starting with a highest priority document type that is determined to have the highest confidence to match the inputted portion 109. Any number of document types may be output in the ordered list 116, such as two, three, four, and/or more. The ordered list 116 of document types may represent a most likely type of document that corresponds to the input (e.g., the portion 109, which may include text and/or an assertion derived from text).

Still referring to FIG. 1, the search engine 104 may output a list of documents 118 based on a comparison between the portion 109 and the content of each document in the document database 112 (or a subset of documents in the document database 112 associated with the textual document 106). The list of documents 118 output by the search engine 104 may be ordered based on semantic similarity and/or lexicographical similarity with the portion 109.

FIG. 1 shows a computing device 114 receiving the ordered list 112 of document types from the model 102 and the document list 118 from the search engine 104. The computing device 114 may be a remote server, the client computing device 110, and/or any other computing device. For example, the computing device 114 may be a server computer in communication with the client computing device 110 that receives an initial query (e.g., based on the portion 109), communicates with the model 102 and/or search engine 104 to provide inputs, and receives the corresponding outputs. It will be appreciated that one or more computing devices, including the client computing device 110, may be used to perform any of the steps described herein.

The computing device 114 processes both the document list 118 and the ordered list 116 of document types to generate a ranked list of documents 120. The ranked list of documents 120 may be used to generate one or more GUIs on and/or by the client computing device 110. As an example, a user of the client computing device 110 may be presented with the ranked list of documents 120 to select from, and the corresponding document may be displayed and/or downloaded upon selection. In non-limiting embodiments, the ranked list of documents 120 is generated by multiplying the rank of each document from the document list 118 by a weight based on the document type and the ordered list 116. For example, a document type of highest priority in the ordered list 116 may have a greater weight than a document type of a lower priority in the ordered list 116. Applying weights to the document list 118 may or may not affect the order of the documents in the ranked list of documents 120.

In some non-limiting embodiments, the search engine 104 and/or model 102 may be at least partially integrated with a word processing system, which may include a word processing application such as Microsoft® Word, Google® Documents, or the like. For example, non-limiting embodiments may be provided as an add-in (e.g., a plug-in, a module, a toolbar, and/or the like) for a word processing application that can be accessed from within the existing word processing application (e.g., through a menu, toolbar, sidebar, popup window, and/or the like). In some examples, the plug-in for the word processing application may interface with a server-side application (e.g., via an application programming interface (API) or the like).

In non-limiting embodiments, the document database 112 may include one or more databases arranged on one or more data storage devices in various locations. In non-limiting embodiments, the document database 112 includes legal documents (e.g., briefs, pleadings, and other writings) and factual documents (e.g., deposition transcripts, exhibits, and/or other evidentiary documents). It will be appreciated that various document databases may be used. For example, additional public and/or private document databases (not shown in FIG. 1) may include court databases, legal authority databases, information resources, and/or the like, and may be accessed via one or more APIs allowing the document database(s) to be queried over a network connection (e.g., over the Internet or a private network connection).

In non-limiting embodiments, a textual document 106 is viewed by a user (e.g., a document author or editor) through the GUI 108. For example, a user may utilize the GUI 108 to draft and/or edit the textual document 106 in a word processing application, and the textual document 106 may be stored locally on the client computing device 110 or on a server computer. The user may select an option on the GUI 108 and/or via a keyboard shortcut to insert a citation or query based on a selected portion.

The user input may identify a portion of the textual document 106 for which a citation is needed and/or for which a query is requested. Identifying the portion of the textual document 106 may include highlighting or selecting one or more sentences, placing the text cursor in a specific position (e.g., following a sentence, in a footnote, and/or the like), or any other input that identifies a specific location for a citation or text that should be associated with a citation.

Figure 2:
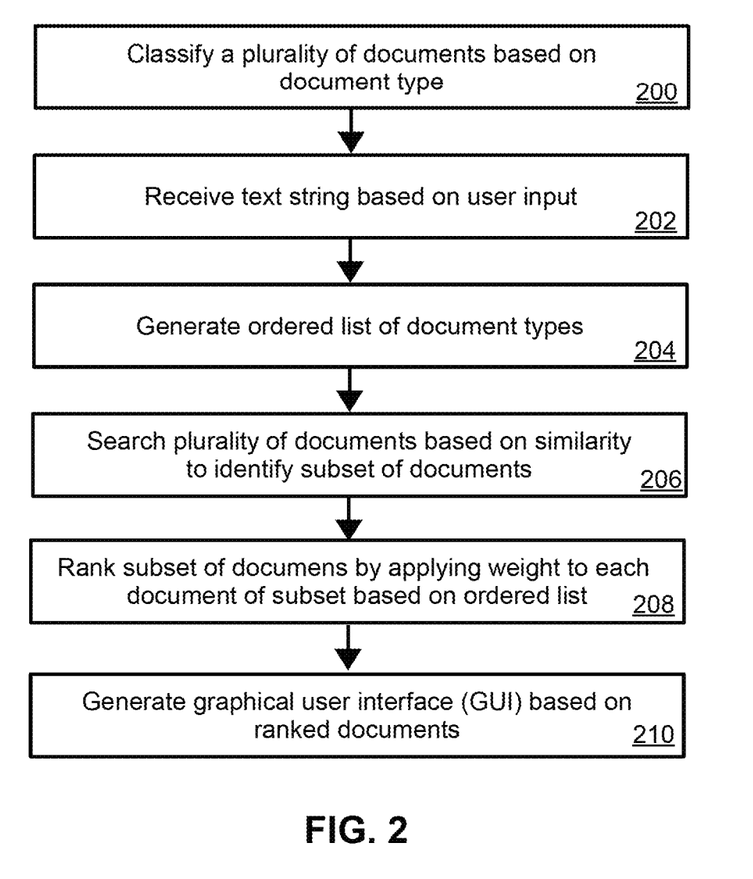
FIG. 2 illustrates a flow diagram for a method for searching a plurality of documents based on a text string according to non-limiting embodiments or aspects.

Referring now to FIG. 2, a flow chart is shown for searching a plurality of documents according to non-limiting embodiments according to non-limiting embodiments. The steps shown in FIG. 2 are for example purposes only. It will be appreciated that non-limiting embodiments may involve additional steps, fewer steps, different steps, and/or a different order of steps. In some non-limiting embodiments or aspects, a step may be performed automatically in response to the completion of a previous step (e.g., may be performed without user intervention upon the completion of a previous step).

At step 200, a plurality of documents may be processed to determine one or more classifications (e.g., labels) for each classification. The classifications may be determined by processing each of the documents with a classification model configured to output a document type, which may be based on a content of the document and include, for example, a court order, transcript, brief, pleading, and/or other like document types. In non-limiting embodiments, a document type may not be based on an encoding or format of the document (e.g., PDF, text, rich text, image, and/or the like) of the document. Step 200 may be performed in advance of the other steps shown in FIG. 2, such that a user may access a pre-classified database of documents. Additionally or alternatively, the documents may be classified and/or re-classified immediately before performance of the other steps (e.g., step 202). The model may be trained based on features extracted from the text of pages or paragraphs of various source documents, such that labeled training data (e.g., indicating relevance or non-relevance) is provided from an annotator and/or direct user feedback during operation.

With continued reference to FIG. 2, at step 202 a text string may be received based on user input. The text string may be a highlighted or selected portion of a textual document, may be typed by a user, and/or the like. A portion of the textual document may be identified and processed based on the text string. For example, the text string may be used as identified by the user without modification. In some non-limiting embodiments, the text string may be modified by adding to it and/or the like. For example, the preceding text (e.g., preceding words and/or sentences), succeeding text (e.g., succeeding words and/or sentences), citations, and/or the like may be added to the text string identified by the user. Moreover, the text string may be normalized, filtered, cleaned, and/or processed with other operations. For example, headers, footers, citations, and other elements may be removed. In some non-limiting embodiments the text string may be segmented into segments, such as individual sentences, paragraphs, footers, and/or the like, such that similarity is assessed for each segment separately. In non-limiting embodiments, the text string selected by a user may be converted into a vector representing at least one assertion based on the text string.

Still referring to FIG. 2, at step 204 an ordered list of document types is generated based on the text string received at step 202. For example, the ordered list of document types may be determined based on the text string as identified by the user, the text string after being modified by one or more operations, and/or one or more vectors derived from the text string. The model may incorporate one or more natural language processing (NLP) techniques for determining an assertion from the text. In some examples, an assertion may correspond to a type of document citation that the user wants to insert. Additionally or alternatively, an assertion may be in a document being reviewed, and a user may want to review a source document that is likely to correspond. As an example, if the text string states "the court ordered that . . . ", it is likely that the user is looking for a court document, such as a court order, rather than a legal brief or deposition transcript. As another example, if the text string states "Bob stated . . . ", it is likely that the user is looking for a transcript or other like document type.

The ordered list of document types may be generated using one or more models configured to determine a predicted document type based on an inputted assertion and/or text string. The model may include, for example, a predictive model trained to accurately predict the type of document that should be cited for a given sentence or portion of a textual document. The model may be a machine-learning model, such as a neural network. The model may be a classification model configured to classify an assertion and/or text string as corresponding to one or more document types. The ordered list of document types may be based on a confidence score associated with the output of the model, such that a predicted document type with the highest confidence score output by the model is first in the ordered list. It will be appreciated that various types of models and ranking algorithms may be used to generate the ordered list of document types. The ordered list may include two or more document types in order of priority (e.g., confidence) for the input.

In non-limiting embodiments, the model may be trained based on a labeled training data set that includes search queries (e.g., strings of words and/or phrases) to a document type (e.g., document classification). In some examples the training data set may include training data from operation of the platform based on user feedback (e.g., if previous outputs were accepted or not accepted by a user). It will be appreciated that, in non-limiting embodiments, various types of techniques and training data may be applied.

At step 206 of FIG. 2, a plurality of documents is searched based on similarity to the text string received at step 202. A search engine may perform the search by comparing the text string with the content of each document of a set of documents stored in a document database. The set of documents may be documents relating to a case, to a textual document being prepared and/or edited, and/or all documents in one or more folders, as examples. The search may be based on semantic similarity and/or lexicographical similarity and result in a subset of documents ranked in an order. The order of the subset of documents may be based on a similarity score output by the search engine and may represent the similarity of each document as compared to the inputted text string.

With continued reference to FIG. 2, at step 208 the subset of documents is ranked (e.g., re-ranked in examples in which the output of the search engine is already ranked based on similarity) based on the ordered list of document types. For example, the initial rank based on similarity may be modified by applying a weight to each document based on the document type. A document type with a high priority (e.g., first in the ordered list generated at step 204) may be given a greater rank in the subset of documents, even if the similarity ranking is relatively lower. In non-limiting embodiments, the subset of documents may be ranked based on a relevance score that combines a similarity score with a weight based on document type. As an example, if the text string states "the court ordered that . . . ", a semantic similarity search may identify documents with the same phrase and rank them relatively high. Such documents would not likely be a court order, but rather other documents referencing the court order. Therefore, while the semantic similarity score may be high, the fact that the similar documents are not court orders and that a court order document type is a top priority in the ordered list of document times would result in the documents being ranked relatively lower (e.g., by being given lower weights as compared to court orders). In such cases, a court order may be ranked first.

At step 210 of FIG. 2, a GUI is generated based on the ranked subset of documents. For example, a user of a word processing application may be presented with a GUI (such as a pop-up window, a frame, a tab, and/or the like) with one or more documents based on the subset of documents to choose from. In this manner, a user may select a document to be cited in the textual document being prepared and/or edited. The word processing application and/or application interacting with the word processing application may insert a document citation into the textual document (e.g., after the segment selected by the user) automatically and in response to the user selecting the desired document from the subset of documents. In non-limiting embodiments, the most-relevant document (e.g., the first ranked document) may be automatically selected and presented to the user and/or inserted as a citation in the document without any further user input.

Non-limiting embodiments of a system and method for searching a plurality of documents may be provided as a standalone application executable by a client computer and/or server computer, an add-in (e.g., such as a plug-in) for a word processing application, or as part of any other type of application that can interact with documents and/or receive queries from users.

Non-limiting embodiments may be used for research, to automatically determine and insert citations, and/or other like purposes. As an example, a user may draft a document that includes the sentence: "The court held that the sky is blue. [Add Cite]". The "[Add Cite]" marker may be added by the user and/or word processing application. In some non-limiting embodiments, the "[Add Cite]" marker may be automatically identified and parsed in real time by a software module of the word processing application or by an add-on of the word processing application and/or other software application. The text string "The court held that the sky is blue" may therefore be identified by the user selecting it or automatically identified as preceding the "[Add Cite]" marker. Various other arrangements are possible. The text string may then be subjected to a semantic similarity comparison with a set of documents in a document database, which may include deposition transcripts, court orders, laws, rules, regulations, and/or the like, and may be in the form of individual pages, paragraphs, set of pages, and/or the like. The result of the similarity comparison may include a selection of relevant source text fragments from the corpus of documents. The selection of relevant source text fragments may be from documents from different categories (e.g., document types), such as transcripts, court orders, pleadings, and/or the like. The text string "The court held that the sky is blue" may then be processed (or may have been previously or concurrently processed) to identify an expected (e.g., predicted) document type. For example, upon analyzing the unstructured text "The court held that . . . ", the model may determine that the information about the subject of the sentence (the court) indicates the document type that would be most relevant to the user's query (a court order). Based on this determination, the selected relevant source documents may be ranked higher if they are classified as a court order than other documents that also contain the fact "the sky is blue" or even the exact language of the text string. As an example, if the court order said "The clouds give the impression of a colorful environment up above", the court order document would rank higher than a transcript including testimony saying that "the sky is blue" as a direct quote.

As another example, non-limiting embodiments may be used to find a related document for research purposes without relating to a document citation. For example, a user may select a text string from a document being reviewed to identify documents or portions thereof that support an assertion in the text string. In some examples, a page type within a document may further impact the ranking. For example, if a similar string appears on a title page of one document and in the body of another document, the document which has the string in the body may be ranked higher since the page type (body of document, for example) is given a greater weight than a title page (e.g., because a title page may be less relevant). As another example, some documents may include multiple documents compiled together such that some pages (e.g., documents) are more relevant than others.

Figure 3:
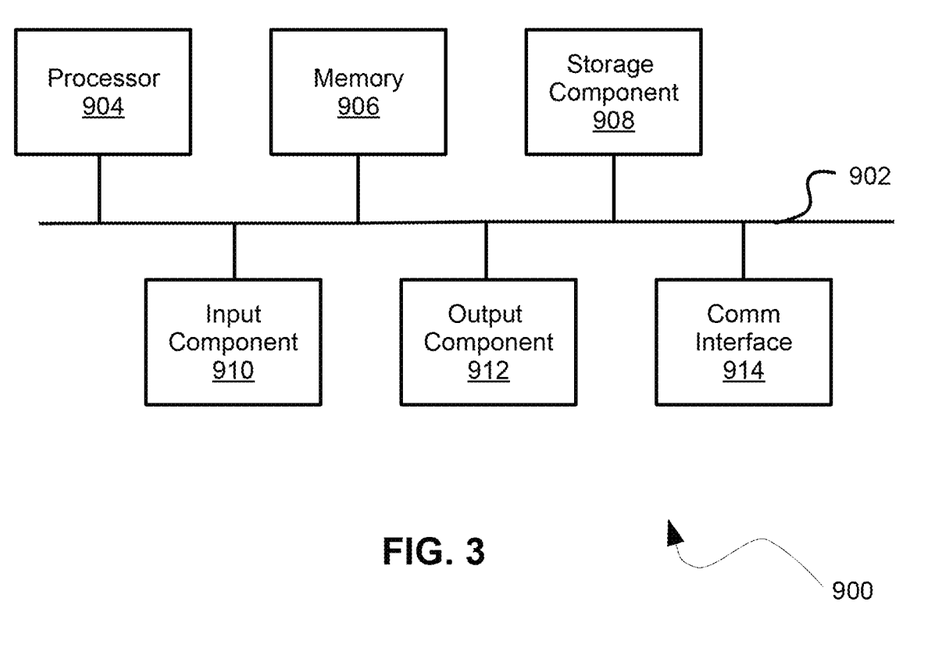
FIG. 3 illustrates example components of a device used in connection with non-limiting embodiments or aspects of systems, methods, and computer program products for inserting citations into a textual document.

Referring now to FIG. 3, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 1. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed or configured to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 3, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising at least one processor programmed or configured to:
    identify a plurality of documents comprising a plurality of document types, each document of the plurality of documents comprising a document type of the plurality of document types;
    receive a text string based on user input;
    generate, with a machine-learning model, an ordered list of document types based the text string;
    search the plurality of documents for the text string to identify a subset of documents based on similarity between the text string and each document of the subset of documents;
    rank the subset of documents based at least partially on the similarity, a document type of each document of the subset of documents, and the ordered list of document types; and
    generate a graphical user interface based on the ranked list of documents.

2. The system of claim 1, wherein receiving the text string comprises identifying a selected portion of a textual document, the text string comprising the selected portion of the textual document and/or a portion of the textual document related to the selected portion.

3. The system of claim 1, wherein generating the ordered list of document types based one the text string comprises:
    determining at least one assertion based on the text string; and
    inputting a vector representing the at least one assertion into the machine-learning model, the machine-learning model configured to output the ordered list of document types.

4. The system of claim 1, wherein each document of the plurality of documents comprises metadata comprising the document type.

5. The system of claim 1, wherein the at least one processor is further programmed or configured to:
generate a citation based on a document from the ranked list of documents.

6. The system of claim 1, wherein the plurality of document types comprises at least one of the following: court orders, transcripts, briefs, pleadings, or any combination thereof.

7. The system of claim 1, wherein the at least one processor is further programmed or configured to:
classify, with at least one classification model, each document of the plurality of documents, such that each document is classified as at least one document type.

8. The system of claim 1, wherein receiving the text string comprises:
receiving the user input;
identifying the text string based on the user input; and
pre-processing the text string.

9. A computer-implemented method comprising:
identifying, with at least one processor, a plurality of documents comprising a plurality of document types, each document of the plurality of documents comprising a document type of the plurality of document types;
receiving, with at least one processor, a text string based on user input;
generating, with at least one processor and a machine-learning model, an ordered list of document types based the text string;
searching, with at least one processor, the plurality of documents for the text string to identify a subset of documents based on similarity between the text string and each document of the subset of documents;
ranking, with at least one processor, the subset of documents based at least partially on the similarity, a document type of each document of the subset of documents, and the ordered list of document types; and
generating, with at least one processor, a graphical user interface based on the ranked list of documents.

10. The computer-implemented method of claim 9, wherein receiving the text string comprises identifying a selected portion of a textual document, the text string comprising the selected portion of the textual document and/or a portion of the textual document related to the selected portion.

11. The computer-implemented method of claim 9, wherein generating the ordered list of document types based the text string comprises:
determining at least one assertion based on the text string; and
inputting a vector representing the at least one assertion into the machine-learning model, the machine-learning model configured to output the ordered list of document types.

12. The computer-implemented method of claim 9, wherein each document of the plurality of documents comprises metadata comprising the document type.

13. The computer-implemented method of claim 9, further comprising:
generating a citation based on a document from the ranked list of documents.

14. The computer-implemented method of claim 9, wherein the plurality of document types comprises at least one of the following: court orders, transcripts, briefs, pleadings, or any combination thereof.

15. The computer-implemented method of claim 9, further comprising:
classifying, with at least one classification model, each document of the plurality of documents, such that each document is classified as at least one document type.

16. The computer-implemented method of claim 9, wherein receiving the text string comprises:
receiving the user input;
identifying the text string based on the user input; and
pre-processing the text string.

17. A computer program product comprising at least one non-transitory computer-readable medium including program instructions that, when executed by at least one processor, cause the at least one processor to:
identify a plurality of documents comprising a plurality of document types, each document of the plurality of documents comprising a document type of the plurality of document types;
receive a text string based on user input;
generate, with a machine-learning model, an ordered list of document types based the text string;
search the plurality of documents for the text string to identify a subset of documents based on similarity between the text string and each document of the subset of documents;
rank the subset of documents based at least partially on the similarity, a document type of each document of the subset of documents, and the ordered list of document types; and
generate a graphical user interface based on the ranked list of documents.

18. The computer program product of claim 17, wherein receiving the text string comprises identifying a selected portion of a textual document, the text string comprising the selected portion of the textual document and/or a portion of the textual document related to the selected portion.

19. The computer program product of claim 17, wherein generating the ordered list of document types based one the text string comprises:
determining at least one assertion based on the text string; and
inputting a vector representing the at least one assertion into the machine-learning model, the machine-learning model configured to output the ordered list of document types.

20. The computer program product of claim 17, wherein each document of the plurality of documents comprises metadata comprising the document type.

* * * * *